United States Patent [19]

Essers et al.

[11] 4,016,397
[45] Apr. 5, 1977

[54] METHOD OF AND APPARATUS FOR ARC WELDING

[75] Inventors: Wilhelmus Gerardus Essers; Gerrit Willem Tichelaar, both of Eindhoven, Netherlands

[73] Assignee: U.S. Philips Corporation, New York, N.Y.

[22] Filed: July 1, 1975

[21] Appl. No.: 592,351

Related U.S. Application Data

[63] Continuation of Ser. No. 426,958, Dec. 20, 1973, abandoned.

[30] Foreign Application Priority Data

Oct. 31, 1973 Netherlands ............ 7314927

[52] U.S. Cl. ............... 219/121 P; 219/75; 219/121 R; 219/130
[51] Int. Cl.² ............ B23K 9/00
[58] Field of Search ........... 219/121 P, 121 R, 74, 219/75, 76, 130, 131 F; 313/231.3, 231.4; 315/111.2

[56] References Cited
UNITED STATES PATENTS

| | | | |
|---|---|---|---|
| 3,153,133 | 10/1964 | Ducati | 219/121 P |
| 3,248,513 | 4/1966 | Sunnen | 219/76 |
| 3,311,735 | 3/1967 | Winzeler et al. | 219/121 P |
| 3,344,256 | 9/1967 | Anderson | 219/121 P |
| 3,612,807 | 10/1971 | Liefkens et al. | 219/121 P |
| 3,790,742 | 2/1974 | Auer | 219/121 P |
| 3,818,175 | 6/1974 | Essers et al. | 219/121 P X |
| 3,830,997 | 8/1974 | Essers et al. | 219/121 P X |

FOREIGN PATENTS OR APPLICATIONS 1,352,131   5/1974   United Kingdom ............ 219/121 P

OTHER PUBLICATIONS

"Plasma Mig Welding" Welding Technology Data Sheet 46, 12/1974.

*Primary Examiner*—Bruce A. Reynolds
*Assistant Examiner*—M. H. Paschall
*Attorney, Agent, or Firm*—Frank R. Trifari

[57] ABSTRACT

Method of arc welding in which an electric arc is maintained between a welding wire and a workpiece in a thermally ionized gas which is produced by an electric arc maintained between the workpiece and the inner surface of a nozzle which acts as a non-consumable electrode as a substitute for a separate tungsten electrode.

6 Claims, 1 Drawing Figure

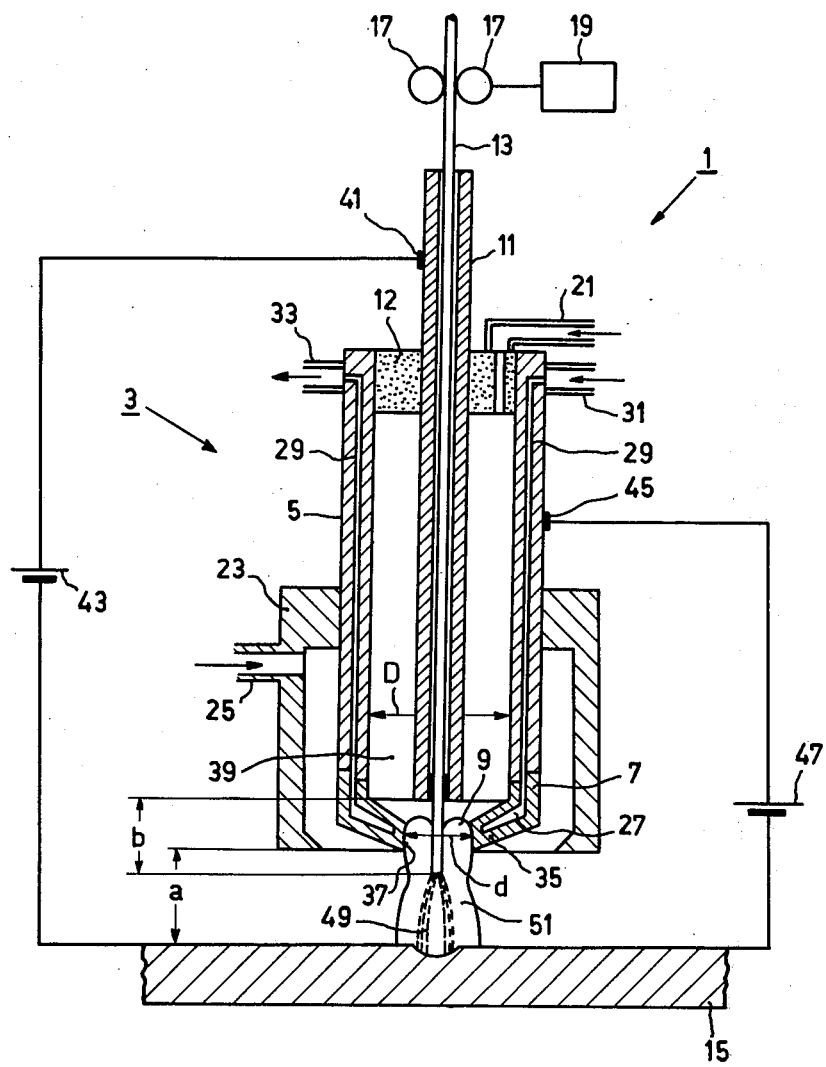

METHOD OF AND APPARATUS FOR ARC WELDING

This is a continuation, of application Ser. No. 426,958, filed Dec. 20, 1973 now abandoned.

BACKGROUND OF THE INVENTION

The invention relates to a method of, and an apparatus for, arc welding in which a consumable electrode is axially fed through a nozzle and a welding arc is maintained between the consumable electrode and a workpiece in a thermally ionized gas which is generated by maintaining a plasma arc in a stream of gas between a non-consumable electrode and the workpiece.

Such a method is described in British Pat. No. 1,276,110; in this known method the plasma arc is maintained between the workpiece and a separate tungsten electrode located upstream of the nozzle; the minimum distance between the tungsten electrode and the workpiece is comparatively large; this adversely affects the stability of the plasma arc.

It is an object of the present invention to provide a method which does not suffer from the said disadvantage and can be performed in a simpler manner by means of a simplified apparatus.

SUMMARY OF THE INVENTION

According to the invention the objects are mainly achieved in that the plasma arc is maintained between the inner surface of the nozzle and the workpiece. The use of the nozzle as a non-consumable electrode dispenses with the need for a separate tungsten electrode; because the plasma arc attaches to the inner surface of the nozzle, the thermally ionized gas, hereinafter referred as arc plasma, is brought near to the consumable electrode with a consequent improvement of the heat transfer to the consumable electrode; because the distance between the plasma arc root on the nozzle and the workpiece is only slightly greater than the stand-off distance between the nozzle and the workpiece the stability of the plasma arc is improved. Moreover in the method according to the invention consumable electrodes may be used of increased diameter and at larger welding currents than in the known method.

In a preferred embodiment of the method according to the invention the plasma arc is spontaneously started by striking the welding arc. The welding arc may simply be struck by contacting the consumable electrode with the workpiece. This manner of striking the plasma arc dispenses with the need for a separate high-frequency generator as generally used in the known method. In addition, extinction of the plasma arc during welding is substantially precluded.

The nozzle which acts as a non-consumable electrode may for example be made of tungsten. A tungsten nozzle, however, has the disadvantage that in the case of positive polarity of the nozzle and of the consumable electrode the tungsten may locally melt and constitute an anode for the plasma arc more readily than the remaining, colder part of the nozzle; this may result in uneven attachment of the plasma arc to the nozzle.

Another disadvantage of a tungsten nozzle is that spatters from the workpiece mix with the molten tungsten and subsequently the workpiece material slowly evaporates from the mixture, which gives rise to instability of the plasma arc.

In another preferred embodiment of the method according to the invention the above disadvantages are avoided by the use of a water-cooled copper nozzle. Experiments have shown that owing to the high thermal conductivity of copper such a nozzle does not melt and has an even temperature around its circumference, which results in even attachment of the plasma arc to the entire inner surface of the nozzle.

For carrying out the method a welding torch is used which comprises a housing provided with a nozzle having an orifice, with a gas supply, with a contact tube and with means for connecting the contact tube to supply source. According to the invention this welding torch is characterized in that the nozzle is designed as a non-consumable electrode and is provided with means for connection to a supply source and with a collar which surrounds the orifice and acts as a ring electrode. These steps enable the method to be carried out by means of a comparatively simple and compact welding torch. Owing to the absence of a separate tungsten electrode in the torch the contact tube may extend up to the immediate vicinity of the nozzle so that welding may be performed with a very short free wire extension, i.e., the projecting part of the welding wire extending freely beyond the end of the contact tube. The collar which acts as a ring electrode provides an enlargement upstream of the orifice; this prevents the plasma arc from climbing along the inner surface of the nozzle and fusing the contact tube; thus the plasma arc root is stabilized and localized on the inner circumference of the collar.

It should be noted that welding torches in which the nozzle is provided with a collar surrounding the orifice are known; however, in these known welding torches the nozzle and the collar do not act as electrodes.

In a preferred embodiment of the welding torch according to the invention the nozzle is made of copper and provided with cooling passages. A copper nozzle can be cheaply and simply manufactured.

The invention also relates to an apparatus for carrying out the method which comprises two individually controllable supply sources and means for feeding a consumable electrode; one of the supply sources has a flat output characteristic and serves in known manner for maintaining the welding arc; the other supply source has a steeply drooping output characteristic and serves to maintain the plasma arc. The apparatus is characterized by a welding torch according to the invention in which the contact tube is connected to one supply source and the nozzle is connected to the other supply source. The individual control of the two supply sources enables the welding arc and the plasma arc to be optimally chosen. Welding may be performed with the consumable and non-consumable electrodes connected to the negative terminal, the welding arc being shaped in the form of a cone. If welding is effected with both electrodes connected to the positive terminal, variation of the current density permits obtaining in known manner various forms of material transfer and in particular a cylindrical or conical welding arc with concentrated material transfer resulting in a deep penetration type weld and a rotating welding arc with disperse material transfer giving a wide shallow deposit.

It should be noted that it is known to weld with a welding arc between a consumable electrode and a workpiece and a plasma arc between a nozzle and the workpiece; in the known method, however, the plasma arc attaches to the lower surface of the nozzle which is made of tungsten; before the welding arc is started first the plasma arc must be struck; both electrodes are connected to a common supply source; in order to maintain the plasma arc the supply source must have a steeply drooping output characteristic so that the current density in the consumable electrode cannot be varied in the desired manner.

An embodiment of the invention will now be described, by way of example, with reference to the accompanying diagrammatic drawing the single Figure of which shows an apparatus for carrying out the method according to the invention.

DETAILED DESCRIPTION OF THE PREFERRED EMBODIMENT

Referring now to the Figure, an apparatus 1 includes a welding torch 3 having a housing 5 which is provided with a nozzle 7 having an orifice 9 of diameter d. The housing 5 accommodates a contact tube 11 which is insulated from the housing 5 by a cap 12 made of insulating material. A welding wire 13 can be axially guided by a contact tube 11 to pass through the orifice 9 towards a workpiece 15. The wire 13 is fed by means of feed rollers 17 which are driven at an adjustable speed by a motor 19. The welding torch 3 further comprises a supply duct 21 for the supply of a plasma gas, for example argon. A shielding hood 23 which surrounds the nozzle 7 is provided with an inlet 25 for the supply of a shielding gas, for example a mixture of argon and gaseous carbon dioxide. The shielding gas mainly serves to shield the molten pool and the workpiece against oxidation. The nozzle 7 is formed with cooling chambers 27 which via cooling ducts 29 in the housing 5 communicate with an inlet 31 and an outlet 33 for cooling water.

The nozzle 7 acts as a non-consumable electrode and hence is made of copper and provided with a collar 35 having a cylindrical inner circumference 37 which surrounds the orifice 9. The inner diameter D of the nozzle 7 upstream of the collar 35, which is equal to the inner diameter of the housing 5, is greater than the diameter d of the orifice 9. Thus upstream of the collar 35 an enlarged chamber 39 is formed which surrounds the contact tube 11. Via the contact tube 11 and a terminal 41 the welding wire 13 is connected to one of the poles of a first supply source 43 which has a flat output characteristic and the other pole of which is connected to the workpiece 15. By means of a terminal 45 on the housing 5 the nozzle 7 is connected to one of the poles of a second supply source 47 which has a drooping output characteristic and the other pole of which is connected to the workpiece 15. The contact tube 11 and the nozzle 7 have the same polarity. The stand-off distance between the nozzle 7 and the workpiece 15 is denoted by $a$; the free extension of the welding wire 13 is designated by $b$.

To carry out the method a plasma gas is passed through the housing 5 via a supply pipe 21. A shielding gas is supplied via an inlet 25 in the shielding hood 23. By driving the welding wire 13 and bringing it in contact with the workpiece 15 a welding arc 49 is struck. The welding arc caused a plasma arc 51 to be spontaneously started between the nozzle 7 and the workpiece 15. The plasma gas flowing through the orifice 9 is ionized by the plasma arc 51 and forms a shield which encloses the free end of the welding wire 13 and the welding arc 49.

The electromagnetic force exerted on the ionized plasma gas by the current in the welding wire causes the plasma arc to be radially drawn inwards and upwards so as to attach the cylindrical inner circumference 37 of the collar 35 which acts as a ring electrode. The restricted axial dimension of the inner circumference 37 and the increased-diameter chamber 39 upstream of the collar 35 prevent the plasma arc from climbing upwards.

The Figure shows an embodiment of the apparatus according to the invention. It will be clear that the nozzle and the collar may have other sizes and shapes. A necessary feature is that the collar is able to act as a ring electrode, and that an increased-diameter chamber is formed in the nozzle and/or in the housing upstream of the collar.

What is claimed is:

1. In a plasma arc welding apparatus operable with a workpiece, welding wire, current supply means and a source of plasma gas, the apparatus including a tubular housing with a nozzle and orifice at the discharge end thereof, a contact tube situated within said housing with an annular chamber defined between said housing and contact tube for plasma gas flow from said source, means for transporting said welding wire through said contact tube and nozzle orifice, said contact tube having a terminal end positioned upstream said orifice, and consumable and non-consumable electrode means for establishing welding and plasma arcs respectively, the improvement in combination therewith wherein said consumable electrode means comprises said contact tube, said welding wire extending from said tube, said current supply means in circuit with said tube, wire and said workpiece for establishing said welding arc between said extending welding wire and said workpiece, and said non-consumable electrode means is a single non-consumable electrode comprising a copper nozzle, means for cooling said nozzle, and said current supply means in circuit with said workpiece for establishing said plasma arc between said nozzle and said workpiece, said nozzle orifice has a diameter $d$, and said annular chamber upstream of and communicating with said nozzle orifice has a diameter D greater than $d$, and said orifice has a predetermined axial length forming a collar, whereby said collar acts as a ring-electrode having an inner circumferential surface from which said plasma arc emanates, and which prevents the plasma arc from climbing axially inward of the nozzle beyond said collar.

2. Apparatus according to claim 1 wherein said terminal end of the contact tube is in the immediate vicinity of said orifice.

3. Apparatus according to claim 1 wherein said contact tube and nozzle have the same polarity.

4. Apparatus according to claim 1 wherein said current supply means comprises a first supply source having flat output characteristic in circuit with said contact tube, and a second supply source having a drooping output characteristic in circuit with said nozzle.

5. Apparatus according to claim 1 wherein said nozzle is formed of copper, and has defined therein passage for a cooling medium.

6. In a method of plasma arc welding with a consumable electrode fed axially through a contact tube having its discharge end situated within water-cooled copper a nozzle and adjacent the orifice of said nozzle, wherein a welding arc is maintained between said consumable electrode and a workpiece, and a plasma arc is maintained between a single non-consumable electrode and the workpiece, the improvement in combination therewith comprising initiating the method of plasma arc welding by striking the end of the consumable electrode on the workpiece, providing a first current supply with a flat output characteristic in circuit with said consumable electrode, providing a second current source with a drooping output characteristic in circuit with said nozzle, and locating the terminal end of said contact tube adjacent said nozzle orifice.

* * * * *